March 23, 1937. C. C. HARPER ET AL Re. 20,304
COPY HOLDER
Original Filed July 10, 1931 4 Sheets-Sheet 1
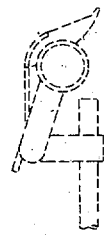
Fig. 1
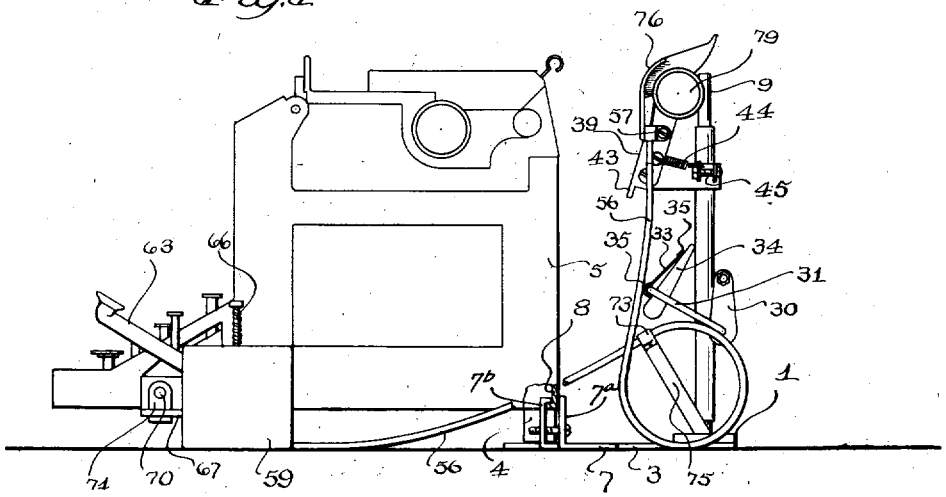
Fig. 2
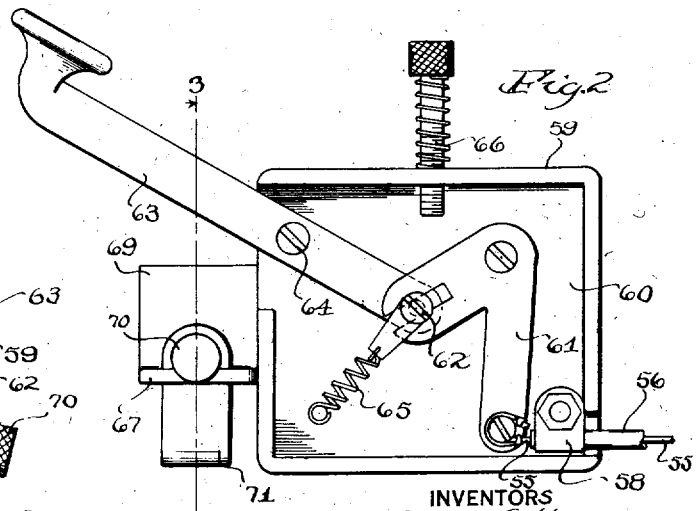
Fig. 3
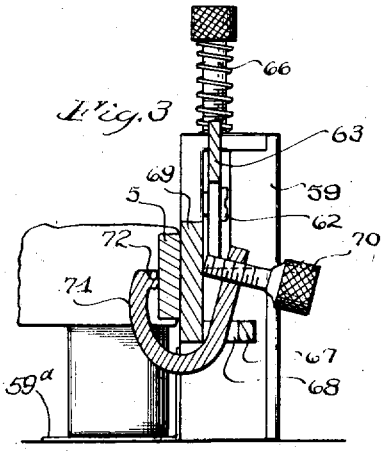
INVENTORS
Clair C. Harper
Eugene F. Kittendaugh,
BY
Fred ATTORNEY March 23, 1937. C. C. HARPER ET AL Re. 20,304

COPY HOLDER

Original Filed July 10, 1931 4 Sheets-Sheet 2

INVENTORS
Clair C. Harper
Eugene F. Kitendaugh,
BY
his ATTORNEY

March 23, 1937. C. C. HARPER ET AL Re. 20,304

COPY HOLDER

Original Filed July 10, 1931 4 Sheets-Sheet 3

INVENTORS
Clair C. Harper
Eugene F. Kitendaugh,
BY
his ATTORNEY

March 23, 1937. C. C. HARPER ET AL Re. 20,304
COPY HOLDER
Original Filed July 10, 1931 4 Sheets-Sheet 4
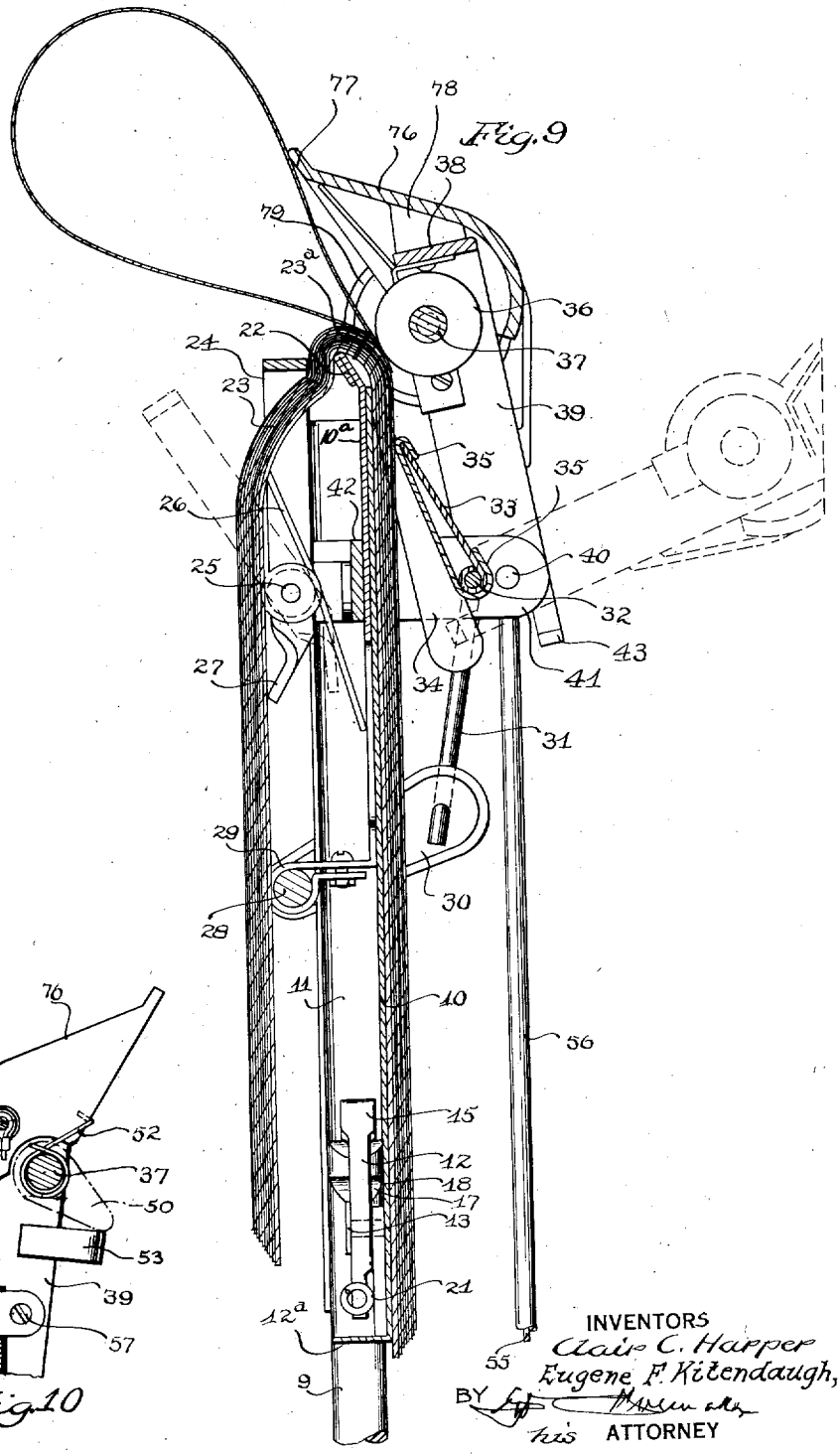
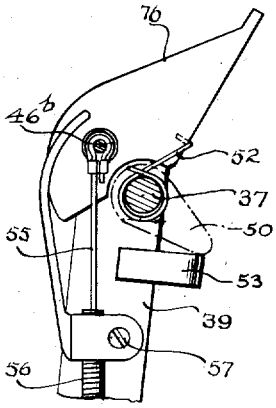
Fig. 10
INVENTORS
Clair C. Harper
Eugene F. Kitendaugh,
BY
his ATTORNEY Reissued Mar. 23, 1937 Re. 20,304

UNITED STATES PATENT OFFICE 20,304

COPY HOLDER

Clair C. Harper, Pomfret, Conn., and Eugene F. Kitendaugh, Oneida, N. Y., assignors, by mesne assignments, to The Dawn Manufacturing Corporation, Rochester, N. Y., a corporation of New York Original No. 1,919,429, dated July 25, 1933, Serial No. 550,012, July 10, 1931. Application for reissue January 12, 1935, Serial No. 1,564

8 Claims. (Cl. 120—32)

The present invention relates to copy holders and an object thereof is to make it possible to feed sheets one at a time from a stack of sheets such as the sheets of a stenographer's notebook past a line guide. Another object of the invention is to provide an improved means for feeding sheets past a line guide of a copy holder. Still another object of the invention is to provide a copy holder which may be collapsed into small space in rear of a type-writing machine so that it may be enclosed in a cabinet with the machine and will not be required to be removed from its position in rear of the machine when the latter is not being used.

To these and other ends, the invention consists of certain parts and combinations of parts, all of which will be hereinafter described; the novel features being pointed out in the appended claims.

In the drawings:

Fig. 1 is a side view of a typewriting machine showing the copy holder in lowered position in full lines and in raised position in dotted lines, certain parts are shown broken away at the lower right hand corner of the figure in order to more clearly illustrate certain parts which are located laterally or at one side of the parts broken away;

Fig. 2 is an inside view of the housing or support on which the cable operating mechanism is mounted;

Fig. 3 is an enlarged section on the line 3—3, Fig. 2;

Figure 4:
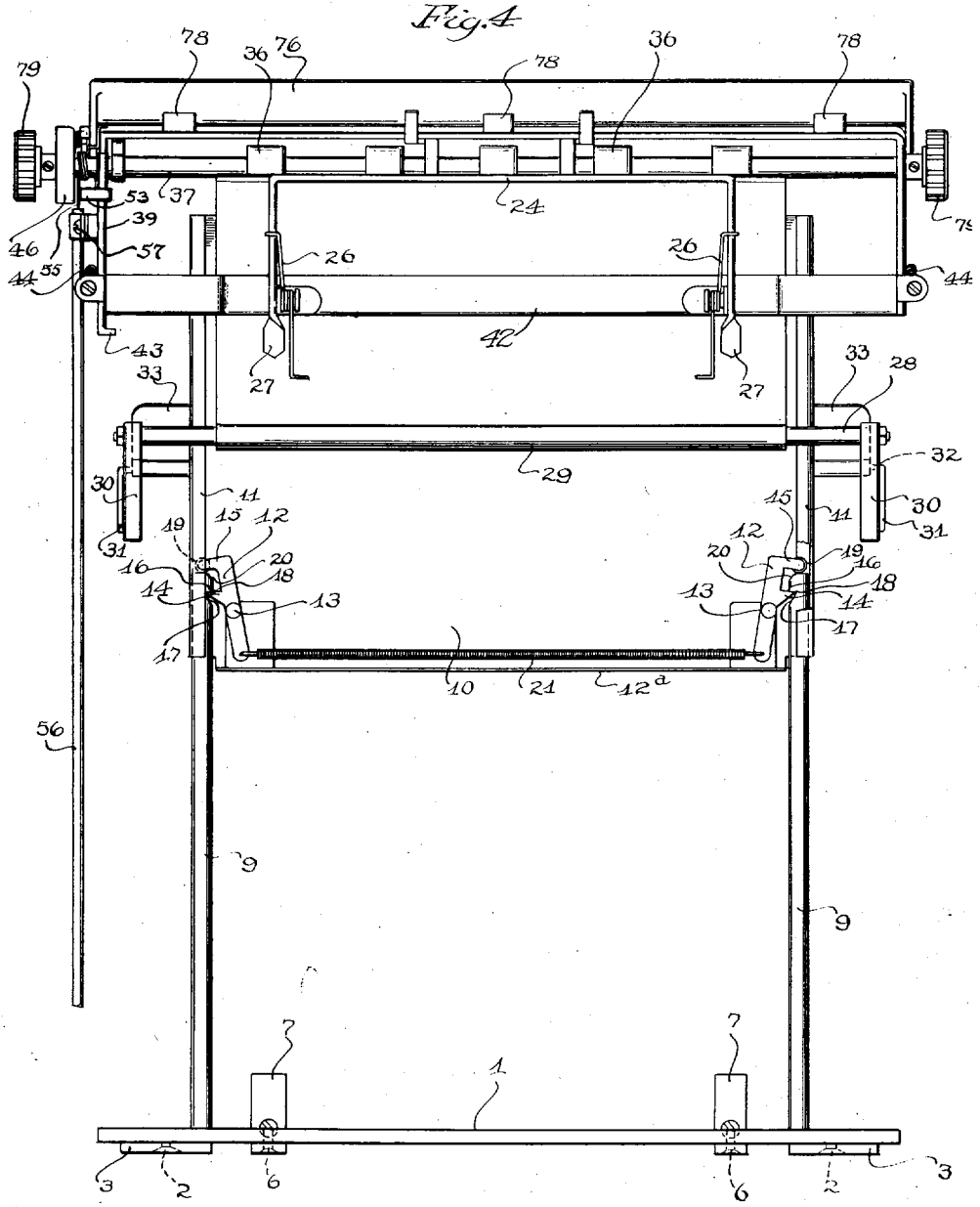
Fig. 4 is a rear view of the copy holder in raised position.
Figure 5:
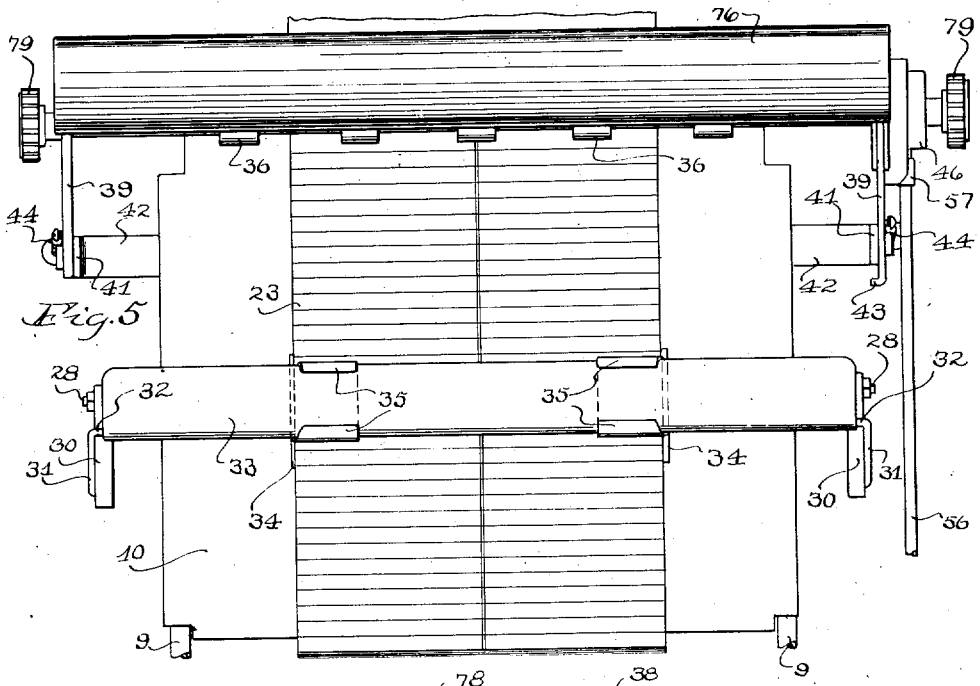
Fig. 5 is a front view of the upper portion of the copy holder.
Figure 6:
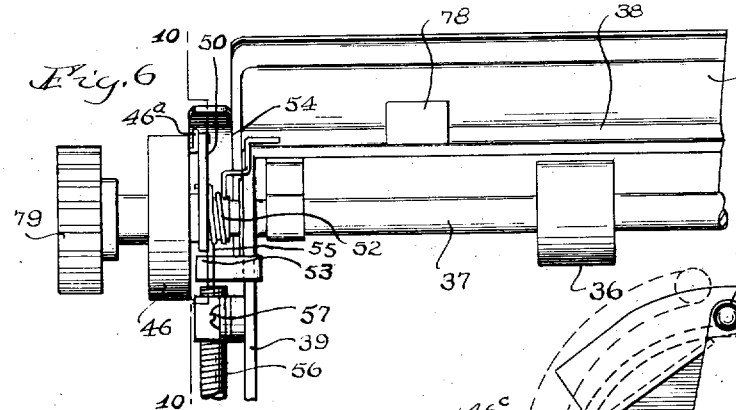
Fig. 6 is a fragmentary rear view of the frame supporting the feeding rollers.
Figure 7:
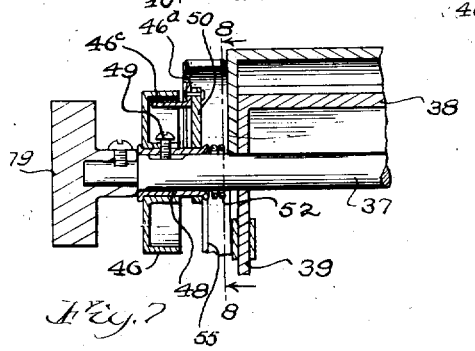
Fig. 7 is a fragmentary sectional view of the sheet feeding mechanism.
Figure 8:
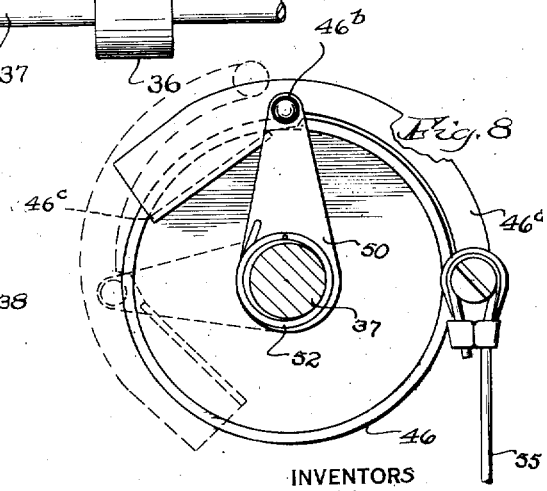
Fig. 8 is a detail sectional view of the clutch in the feeding mechanism on the line 8—8 of Fig. 7.

Fig. 9 is an enlarged vertical section through the upper part of the copy holder showing the feeding mechanism in operative position in solid lines and also swung to an operative dotted line position away from the work support. The copy holder comprehends a line guide mechanism that includes a line guide bar. The line guide mechanism is constructed so that the line guide bar thereof is positionable vertically along the front of and in respect to a plate of the work holder in front of which plate the sheets are supported and in Fig. 9 the parts of this line guide mechanism are shown in one of the positions wherein the line guide bar thereof occupies a relatively high position while in Figs. 1, 4 and 5 the parts of the line guide mechanism are shown in a position wherein the line guide bar occupies a relatively low position in respect to the sheet supporting plate, all of which will be manifest from a comparison of Figs. 1, 4, 5 and 9;

Fig. 10 is a fragmentary section on the line 10—10, Fig. 6.

In the illustrated embodiment of the invention, 1 indicates a base bar of a base frame to which is pivoted at 2 two flat supporting bars 3 which, when in supporting positions, project forwardly from the base bar so that the feet 4 of the typewriting machine 5 may rest thereon. Pivoted at 6, viz., laterally at one side of supporting bar 3 as is clearly seen from Figure 1 in conjunction with Figure 4, to and projecting forwardly from the base bar 1 are two clamps 7 which are adapted to clamp upon the rear bar 8 of the typewriting machine 5. Each of these clamps 7 comprises what may be termed the main or fixed jaw $7^a$ and the movable jaw $7^b$, as is clearly shown in Fig. 1. In this way, the copy holder may be secured in fixed relation to the typewriting machine at the rear of the latter.

The base frame also comprises two rods or guides 9 projecting upwardly in parallel relation from the base bar 1. On this base frame is vertically movable an upper frame comprising, in this instance, a plate 10 having semi-circular guides 11 at opposite vertical edges rolled rearwardly from the metal of which the plate 10 is formed and engaging the outer faces of the guide bars 9 while leaving their inner faces exposed. The lower edge of the plate is turned rearwardly at $12^a$ to strengthen the plate.

With the end in view of holding the upper frame in raised position on the base or lower frame and at the same time preventing the withdrawal of the upper frame from the lower frame the upper frame carries two detents 12 which are pivoted at 13 on the rear side of the plate 10 and have each two detaining portions 14 and 15. The detaining portion 14 of each detent is in the form of a shoulder 16 adapted to enter a notch 17 in the adjacent rod 9 to engage a shoulder 18 at the top of the notch to limit the upward movement of the upper frame on the base frame. The detaining portion 15 carries a roller 19 at its free end to engage the upper end of the adjacent rod 9. Each rod has a beveled portion 20 over which the roller 19 travels. When the upper frame is in its upper position the projecting shoulder 16 of each detent lies in a notch 17 and the roller 19 engages the upper end of the adjacent rod. The two detents are connected below their pivots by a single coil spring 21 which holds the detents toward the guide rods 9 and causes the detents to sustain the upper frame in its raised position by engaging the upper ends of the rods 9. To lower the upper frame on the base frame, the upper frame is pushed downwardly with pressure so that the rollers 19 ride onto the beveled portions 20 which shift the detents on their pivots to tension the spring 21, and shift the portions 14 out of the notches 17, after which the rollers 19 ride down the rods 9 holding the detents against action until the upper frame is again moved to its uppermost position.

The upper portion of the plate 10 is provided with a stiffening or reinforcing plate 10ª, the upper edge of which is deflected rearwardly at an incline at 22 and the matter to be copied is turned over this edge and is clamped to said inclined edge portion 22 of the stiffening plate 10ª. When a stenographer's notebook 23 is to be copied, the back and any number of pages are turned so as to have a position behind the rear face of the plate 10 and 10ª, the binding 23ª being situated at the deflected portion 22. The clamping of these turned pages may be effected by a clamp comprising, in this instance, an inverted U shaped swinging member 24, the arms of which are pivoted at 25 to the rear face of the upper frame member. Springs 26 act on this clamp to hold the horizontal portion toward the upper edge of the rearwardly inclined portion so that said edge assists in the clamping action and forms a clamping member. Finger pieces 27 may be provided at the ends of the arms to provide means through which the clamp may be manipulated.

Associated with the upper work holding frame is a line guide past which the work is moved by a means such as that hereinafter described. This line guide comprises, in this instance, a rocking bar 28 mounted in friction bearings 29 on the rear face of the upper frame and having two rigid arms 30 at its opposite ends. Adjustable on said arms 30 are the arms 31 of a swinging U shaped member the connecting portion 32 of which has a guide plate 33 mounted to swing with friction thereon.

There may be associated with the line guide, a sheet guiding means which, in this instance, comprises two guides 34 projecting rearwardly from the rear face of the line guide and adjustable relatively to each other in the direction of the length of the line guide. In this instance, each sheet guide 34 has guide flanges 35 frictionally embracing the upper and the lower edge of the line guide so that the guides may be shifted to engage opposite side edges of the book leaves in front of the work holding frame. These guides cause the leaves to travel in straight lines past the line guide under the action of the sheet feeding means.

The sheet feeding means comprises, in this instance, a plurality of axially alined feed rollers 36 arranged on a shaft 37 so as to cooperate with the uppermost sheet at the front of the work supporting frame and directly in front of the rearwardly deflected portion 22 slightly below the binding 23ª. The feed roller shaft 37 is supported to move toward and from the work support and is held with yielding pressure toward the work. In this instance, the shaft 37 is supported by a swinging frame having a horizontal connecting portion 38 and two depending arms 39 which are pivoted at 40 to two arms 41 extended forwardly from the ends of a bar 42 secured to the rear face of the work supporting frame as is clearly shown in Figs. 1 and 4. A stop 43 at the lower end of one of these arms serves to limit the outward movement of the swinging frame and the pivots 40 are arranged in advance of the feed shaft 37 so that the weight of the swinging frame and the parts carried thereby hold the rollers 36 with yielding pressure toward the work. Springs 44 may connect the arms 41 with the arms 39 to still further insure the feed rollers being held toward the sheets to be fed, adjusting devices 45 being provided to vary the tension of the springs. The position of the springs 44 from one point of view in reference to the bar 42 and the swinging arms 39 is clearly indicated in Fig. 5, while the position of the springs 44 from another point of view in reference to the bar and swinging arms is illustrated in Fig. 1, wherein the adjusting means 45 is also clearly shown.

The shaft 37 carrying the alined feed rollers 36 has a step by step feed imparted thereto through the medium of step by step feeding mechanism comprising a clutch member in the form of a cup, including an annular flange 46, and has a bushing 48 rigidly secured thereto centrally thereof. This bushing embraces one end of the shaft 37 and is keyed to said shaft by means of a screw or other suitable element 49. The bushing extends inwardly slightly beyond the outer edge of the flange of the cup and an arm 50 is loosely mounted on said bushing to oscillate thereon. A curved arm 46ª is pivoted at 46ᵇ to the outer end of the aforesaid arm 50, and at one end carries a laterally directed lug or shoe 46ᶜ adapted to extend into the cup and intermittently frictionally engage the inner surface of the flange of the cup whereby to effect an alternate gripping and releasing driving connection between said lug or shoe 46ᶜ and the interior of the annular flange 46 of the cup. It will be seen from the foregoing that the cup shaped clutch member that includes the annular flange 46 and the curved arm 46ª which provides the shoe or lug 46ᶜ cooperate and provide what may be termed the friction members or elements of a step by step feeding clutch. This alternate gripping and releasing action is effected in any suitable manner, one way being to connect a flexible pull wire 55 with one end of the said curved arm 46ª and which wire extends through a flexible sheath 56 connected at 57 to member 39 and having its outer end extending into the spacing box 59 where it is attached at 58.

A spring 52 acts on the arm 50 to return said arm normally to starting position, the rear end of the curved arm 46ª engaging the stop 53 to arrest the return movement of both arms 46ª and 50 at starting position. By virtue of this particular character of clutch mechanism it is possible to turn the shaft 37 in either direction in the operation of the copy holder, that is to say, by the operating of the clutch mechanism the step by step feed of the rollers in a forward direction is enabled to be carried out as and when desired or by means of the knob or finger operated wheel 79, hereinafter more fully referred to, the feed rollers can be turned forwardly freely or rearwardly against the friction holding or driving engagement of the clutch construction, which normally tends to prevent or oppose such rearward turning movement.

Mechanism for operating the curved arm 46ª and thereby the clutch mechanism is comprehended within or is carried by a box 59 clearly shown in Figs. 2 and 3. The operating mechanism and the box 59 therefor is arranged conveniently in respect to the keyboard of the typewriting machine and is secured in place at the right front side of the typewriting machine as is clearly shown in Figs. 1 and 3.

The box 59 forms a support for the wire or cable operating means and to this end is formed of two parts providing a chamber 60 between them. In this chamber is mounted a bell crank lever 61 having one arm connected to the lower end of the pull wire. The other arm has a pin and slot connection 62 with a finger lever 63 which is pivoted at 64 to the casing. A spring 65 acts on the pin of the joint between the two levers and returns the pull wire to normal position after each depression of the finger lever 63. An adjustable stop 66 limits the movement of the cable operating mechanism and determines the amount of the spacing or feeding action of the latter. The box 59 has a thin lateral support 59a on its inner side so that the forward foot of a typewriting machine may rest thereon. At the same time the box 59 is clamped to the typewriting machine by a clamp comprising, in this instance, a horizontal lug 67 having a vertical slot 68 and projected from a forward extension 69 on the frame. The side frame of the typewriting machine 5 rests against one face of this extension while a set screw 70 engages the opposite face and is mounted in one arm of a substantially U shaped clamp 71 which is loosely fulcrumed in the lug 67. Said clamp has a gripping portion 72 on the other arm to draw the frame 59 against the frame of the typewriting machine. Between its ends the sheath 56 is slidable in a loop 73 on an arm 75 supported from the base frame.

In order to enclose the feeding mechanism, a hood 76 is supported by the swinging frame 38—39 and extends above and below the horizontal portion 38 of the frame. The upper portion of the hood extends rearwardly and its rear edge 77 serves as a deflector for the fed sheet. Supporting ears 78 extend between the rollers and prevent the sheets being rolled above the rollers in the wrong direction. On the opposite ends of the feed roller shaft finger wheels 79 are provided by which the feed roller may be turning in feeding direction independently of the cable operating means.

The copy holder is designed to occupy a position in rear of a typewriting machine, and when adjusted to its extended position places the line guide directly in rear of the machine substantially on the line of vision of the typist. The upper frame or sheet supporting member may be lowered to the full line position shown in Fig. 1 by exerting a pressure on the top of the copy holder. While the sheet supporting member is in its upper position the sheets in a stack as illustrated in Fig. 9, by a stenographer's notebook, are secured by the clamping means adjacent the top of the leaf supporting member and at the rear side of the latter, the sheets being extended over the upper edge of the leaf supporting member and depending loosely on the front side of said member. The guides 34 are adjusted to engage the opposite vertical edges of the sheets in the stack. The work or sheet feeding roller during the clamping of the work is thrown forwardly to the dotted line position in Fig. 9. On being thrown rearwardly the feeding rollers engage the top sheet in the pack adjacent the upper part of the sheet holding member and upon being turned, the roller draws the top sheet upwardly until such a time that the lower edge of the drawn sheet passes from the roller, when the sheet which has previously been bulged between the roller and the binding falls over the rear side of the sheet holding member and is assisted in this action by the deflector at the upper edge of the roller covering hood. The line guide carries rearwardly projecting edge guides for the stack of sheets and these guides are relatively adjustable to correspond to the width of the sheets. The feed roller is turned by a flexible cable which is enclosed in a sheath secured at one end to the roller support and at the other end to a support for a finger operated device. The latter support carries a novel means of securing it to the side of a typewriting machine in a position convenient for operation by the typist.

What we claim as our invention and desire to secure by Letters Patent is:

1. The combination with a sheet supporting member having the uppermost portion thereof inclining upwardly and rearwardly, a clamp arranged on the rear side of the sheet supporting member to sustain a sheet in a suspended condition over the upper edge of the uppermost portion of the supporting member, a roller, a pivoted support for the roller mounted to support the roller in feeding relation to the sheets adjacent to the rearwardly inclining portion of the supporting member, said support being in front of the axis of the roller in feeding position and below said axis, and a hood on the frame covering the front face of the roller and having its upper edge acting as a sheet deflector and arranged above the upper edge of the copy holder.

2. A copy holder comprising a base member having two rods projecting upwardly therefrom, a sheet supporting member movable on the rods, and means carried by the sheet supporting member and engageable with the upper ends of the rods to hold the sheet supporting member in an elevated position on the rods, said rod ends being provided with inclined notches and said means embodying a pair of spring pressed detents coacting with the shoulders formed by the notches to also limit the upward movement of the sheet supporting member.

3. A copy holder comprising a base member having two rods projecting upwardly therefrom, a sheet supporting member movable on the rods, and means cooperating with the upper ends of the rods to hold the work supporting member in an elvated position on the rods, said means embodying a pair of spring pressed detents each having a roller engaging the upper end of a rod, the rods each having a beveled portion which, on downward pressure on the sheet supporting member, is engaged by the roller and deflects the detent from detaining position.

4. A copy holder comprising a base member having two rods projecting upwardly therefrom, and each formed with a notch providing an abutment, a sheet supporting member movable on the rods, and means for limiting the upward movement of the supporting member on the rods embodying two pivoted spring pressed detents carried by the sheet supporting member between the rods and having portions entering the notches to engage the abutments.

5. In a copy holder, a base, parallel uprights carried by the base, a vertically movable plate provided with hook shaped edges which are formed by the bending rearwardly and thence inwardly of vertically extending edge portions that slidably engage and hook over the outer side portion of the uprights, means carried by the plate at each side thereof for engaging the uprights to hold the plate in elevated position but which means is releasable to permit the plate to be moved to a lowered position, line guide means carried by but spaced from the plate and comprising means carrying a line guide bar which is vertically positioned in respect to but in front of the plate, means for securing work sheets to the plate at the upper portion thereof, and means carried by the plate for feeding upwardly step by step a portion of the work sheet in respect to the plate and in respect to the line guide bar, positioned in front of the sheet.

6. In a copy holder, a vertically movable sheet supporting member provided by a vertically and transversely extending sheet metal plate constituting the main supporting plate of the vertically movable sheet supporting member, said main supporting plate having vertically extending edge portions bent rearwardly thence inwardly to provide hook shaped edges for slidable engagement with vertical upright members and also having a vertically and transversely extending reinforcing plate at the upper transversely extending portion of the supporting plate, which reinforcing plate has a section folded back upon itself and which folded back section is bent so that it inclines upwardly and rearwardly in respect to the vertically and traversely extending main supporting plate, said main supporting plate having secured thereto means providing transversely spaced ears or projecting members located intermediate its height and extending rearwardly therefrom, and pivotally mounted upon said ears a spring pressed inverted U-shaped clamping member, the bight of which U-shaped member provides a horizontally and transversely extending clamping bar arranged immediately behind the upper horizontally and transversely extending edge portion provided by the upwardly and rearwardly inclined section aforementioned, and spring means for effecting the spring pressing of the inverted U-shaped clamping member toward clamping position.

7. A copy holder construction comprising the features of construction defined in and by the claim last preceding, wherein a feeding means is carried by said supporting plate, which said feeding means comprises a series of rollers mounted on a horizontally and transversely extending shaft that is located near the upper portion of but in front of said sheet metal main supporting plate, swinging ears at the upper ends of which said shaft is revolvably mounted, forwardly projecting members carried by said main plate member upon which said forwardly projecting members the lower ends of said swinging ears are pivotally mounted, the arrangement of the roller carrying shaft relative to the pivotal supports for the swinging ears and the structure of the pivotal parts being such that the rollers normally engage the outermost portion of a sheet with sufficient friction whereby when the rollers are rotated they can feed the sheet portion engaged thereby, the construction being such that the upper ends of the swinging ears and the roller carrying shaft can be swung forwardly and downwardly and thereby leave the holder structure unobstructed from above, whereby the sheets of copy work can be inserted into a holding position along an unobstructed downward path.

8. A copy holder construction comprising a sheet metal main supporting plate and feeding means carried thereby, which said feeding means comprises a series of rollers mounted on a horizontally and transversely extending shaft that is located near the upper portion of but in front of said sheet metal main supporting plate, swinging ears at the upper ends of which said shaft is revolvably mounted, forwardly projecting members carried by said main plate member upon which said forwardly projecting members the lower ends of said swinging ears are pivotally mounted, the arrangement of the roller carrying shaft relative to the pivotal supports for the swinging ears and the structure of the pivotal parts being such that the rollers normally engage the outermost portion of a copy sheet with sufficient friction whereby when the rollers are rotated they can feed the sheet portion engaged thereby, the construction being such that the uper ends of the swinging ears and the roller carrying shaft can be swung forwardly and downwardly and thereby leave the holder structure unobstructed from above, whereby the sheets of copy work can be inserted into a holding position along an unobstructed downward path, and a horizontally and transversely extending line guide bar vertically positionable in respect to the main supporting plate and on which line guide bar there are slidably supported transversely positionable guide members providing vertically extending guide fins extending rearwardly from the rear of the line guide bar for the purpose of engaging the edges of the sheets and thus guide or direct the sheets as fed upwardly by the feeding rollers.

CLAIR C. HARPER.
EUGENE F. KITENDAUGH.